(12) United States Patent
Fang et al.

(10) Patent No.: US 10,482,740 B2
(45) Date of Patent: Nov. 19, 2019

(54) ENCODER-LESS LIDAR POSITIONING TECHNIQUE FOR DETECTION AND ALARM

(71) Applicant: Carrier Corporation, Farmington, CT (US)

(72) Inventors: Hui Fang, Shanghai (CN); Antonio M. Vincitore, South Windsor, CT (US); Peter R. Harris, West Hartford, CT (US); Jie Xi, Shanghai (CN)

(73) Assignee: CARRIER CORPORATION, Palm Beach Gardens, FL (US)

(*) Notice: Subject to any disclaimer, the term of this patent is extended or adjusted under 35 U.S.C. 154(b) by 361 days.

(21) Appl. No.: 15/325,239

(22) PCT Filed: Jul. 8, 2015

(86) PCT No.: PCT/US2015/039473
§ 371 (c)(1),
(2) Date: Jan. 10, 2017

(87) PCT Pub. No.: WO2016/007575
PCT Pub. Date: Jan. 14, 2016

(65) Prior Publication Data
US 2017/0200358 A1 Jul. 13, 2017

Related U.S. Application Data

(60) Provisional application No. 62/023,305, filed on Jul. 11, 2014.

(51) Int. Cl.
*G01C 3/08* (2006.01)
*G08B 17/103* (2006.01)
(Continued)

(52) U.S. Cl.
CPC .......... *G08B 17/103* (2013.01); *G01S 7/4817* (2013.01); *G01S 7/4972* (2013.01); *G01S 17/026* (2013.01); *G01S 17/42* (2013.01)

(58) Field of Classification Search
CPC ....... G01S 17/026; G01S 17/42; G01S 7/4817
(Continued)

(56) References Cited

U.S. PATENT DOCUMENTS

| 3,499,159 A | 3/1970 | Carrier et al. |
| 4,306,230 A | 12/1981 | Forss et al. |

(Continued)

FOREIGN PATENT DOCUMENTS

| EP | 0978718 A1 | 2/2000 |
| EP | 1085346 A1 | 3/2001 |
| GB | 2319605 A | 5/1998 |

OTHER PUBLICATIONS

Eisenbach, Jens, et al., "Reducing camera vibrations and photometric changes in surveillance video", 2013 10th IEEE International Conference on Advanced Video and Signal Based Surveillance, Aug. 27, 2013, 5 pages.

(Continued)

*Primary Examiner* — Mark Hellner
(74) *Attorney, Agent, or Firm* — Cantor Colburn LLP

(57) ABSTRACT

A method for monitoring an area includes distributing, by a detector unit, light during a first instance of time in order to characterize the area based on first data associated with the first instance of time; distributing, by the detector unit, light during at least a second instance of time in order to obtain second data; comparing a first portion of the second data to at least one of: a second portion of the second data and the first data; and based on the comparison, signaling an alarm (Continued)

condition by the detector unit when an evolution in the second data is detected in an amount greater than a threshold.

12 Claims, 7 Drawing Sheets

(51) Int. Cl.
*G01S 17/02* (2006.01)
*G01S 7/481* (2006.01)
*G01S 7/497* (2006.01)
*G01S 17/42* (2006.01)

(58) Field of Classification Search
USPC ............................................................ 356/5.01
See application file for complete search history.

(56) References Cited

U.S. PATENT DOCUMENTS

| | | |
|---|---|---|
| 4,477,727 A | 10/1984 | Rud |
| 4,871,999 A | 10/1989 | Ishii et al. |
| 4,893,026 A | 1/1990 | Brown De Colstoun et al. |
| 5,225,810 A * | 7/1993 | Inoue .................. G08B 17/103 250/574 |
| 5,477,218 A | 12/1995 | Manmoto et al. |
| 6,181,251 B1 | 1/2001 | Kelly |
| 6,404,494 B1 | 6/2002 | Masonis et al. |
| 6,490,530 B1 | 12/2002 | Wyatt |
| 6,608,677 B1 | 8/2003 | Ray et al. |
| 6,876,305 B2 | 4/2005 | Kadwell et al. |
| 7,164,468 B2 | 1/2007 | Correia Da Silva Vilar et al. |
| 7,342,228 B1 | 3/2008 | O'Connell et al. |
| 7,388,662 B2 | 6/2008 | Cantin et al. |
| 7,580,127 B1 | 8/2009 | Mayor et al. |
| 7,741,618 B2 | 6/2010 | Lee et al. |
| 7,787,134 B2 | 8/2010 | Kohnen et al. |
| 8,013,303 B2 | 9/2011 | Ershov et al. |
| 8,089,617 B2 | 1/2012 | Fluckiger |
| 8,269,950 B2 | 9/2012 | Spinelli et al. |
| 8,390,791 B2 | 3/2013 | Vert et al. |
| 8,508,721 B2 | 8/2013 | Cates et al. |
| 8,546,740 B2 | 10/2013 | Vollenweider |
| 10,041,673 B2 * | 8/2018 | Pathangay .............. F23N 5/242 |
| 2008/0246623 A1 | 10/2008 | Nagashima |
| 2010/0194574 A1 | 8/2010 | Monk et al. |
| 2010/0204964 A1 | 8/2010 | Pack et al. |
| 2011/0058167 A1 * | 3/2011 | Knox .................... G01N 15/06 356/338 |
| 2011/0149268 A1 | 6/2011 | Marchant et al. |
| 2011/0313722 A1 | 12/2011 | Zhu et al. |
| 2012/0236379 A1 | 9/2012 | Da Silva et al. |
| 2012/0300191 A1 | 11/2012 | Hinderling et al. |
| 2013/0003041 A1 | 1/2013 | Sigmund et al. |
| 2013/0234856 A1 | 9/2013 | Cole et al. |
| 2015/0338204 A1 * | 11/2015 | Richert .................. G06T 7/593 348/135 |

OTHER PUBLICATIONS

International Search Report for application PCT/US2015/039473, dated Oct. 23, 2015, 5 pages.

* cited by examiner

ENCODER-LESS LIDAR POSITIONING TECHNIQUE FOR DETECTION AND ALARM

BACKGROUND

Smoke detection is important for awareness of fire in its early stages. Conventional point smoke detectors are installed on the ceiling of a room and signal an alarm if smoke of a sufficient density (obscuration level) enters the detector. This configuration is effective in rooms of small size, where smoke transport dynamics play a more limited role in determining the time to alarm. In a large room, however (e.g., a lobby, atrium, or warehouse), the smoke transport time to the detector is relatively long, and extends the time during which the existence or potential existence of a fire is undetected. To address the problem of longer smoke transport time, more smoke detectors can be installed in the space, but this increases the cost of the detection system. As with point detectors, a large room with beam detectors would also require multiple units to obtain acceptable coverage, again providing for a costly detection system.

BRIEF SUMMARY

An exemplary embodiment is a method for monitoring an area including distributing, by a detector unit, light during a first instance of time in order to characterize the area based on first data associated with the first instance of time; distributing, by the detector unit, light during at least a second instance of time in order to obtain second data; comparing a first portion of the second data to at least one of: a second portion of the second data and the first data; and based on the comparison, signaling an alarm condition by the detector unit when an evolution in the second data is detected in an amount greater than a threshold.

Another exemplary embodiment is an apparatus including memory having instructions stored thereon that, when executed, cause the apparatus to: distribute light during a first instance of time in order to characterize an area being monitored based on first data associated with the first instance of time; distribute light during at least a second instance of time in order to obtain second data; compare at least a first portion of the second data to at least the first data; and based on the comparison, signal an alarm condition when an evolution in the second data is detected in an amount greater than a threshold.

Additional exemplary embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
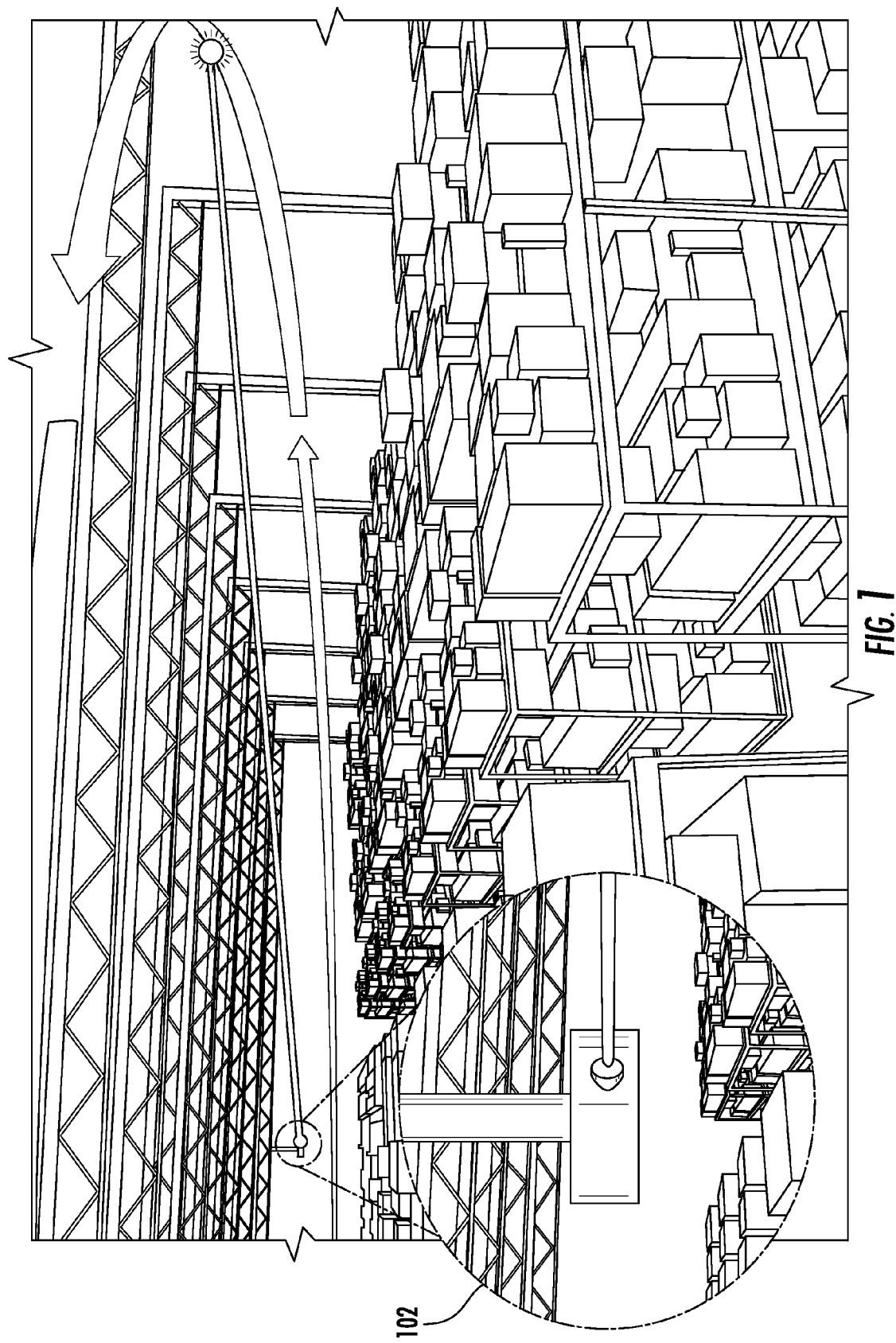
FIG. 1 is a diagram illustrating an exemplary environment incorporating one or more detector units.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for detecting a condition, such as the existence of smoke. When smoke has been detected in an amount greater than a threshold, or a profile associated with a smoke plume has changed in an amount greater than a threshold (potentially as a function of time), an alarm may be asserted or signaled.

In some embodiments, a scanning LIDAR (Light Detection and Ranging, typically utilizing an eye-safe laser as a light source) device may be used to actively look for smoke plumes in, e.g., large rooms. In some embodiments, a laser beam transmission unit and a reception unit may be located in a common device and the range to an object may be determined by measuring the time delay between transmission of a laser pulse and reception of a reflected or scattered signal. A motor may rotate a mirror, or a non-mechanical liquid-crystal-based beam steering device may be used to transmit laser pulses and collect the resulting scattered light. The laser beam may be rotated to scan a two-dimensional (2D) plane surrounding the unit, with a wide field of view, e.g., 360 degrees. An embodiment that incorporates LIDAR scanning for smoke detection is illustrated in FIG. 1. A rotating detector head 102 may be associated with a detector unit.

As described above, a detection of smoke may rely on an analysis of a smoke plume's size and shape as a function of time. As such an ability to compare data collected from a prior rotation of the detector unit/head 102 while in the same position or orientation may be needed. In some embodiments, a phase correlation approach or technique may be used to correctly match and subsequently compare data from prior rotations. In order to make the LIDAR system simple, stable, and low cost, an encoder-less system may be used.

Figure 2:
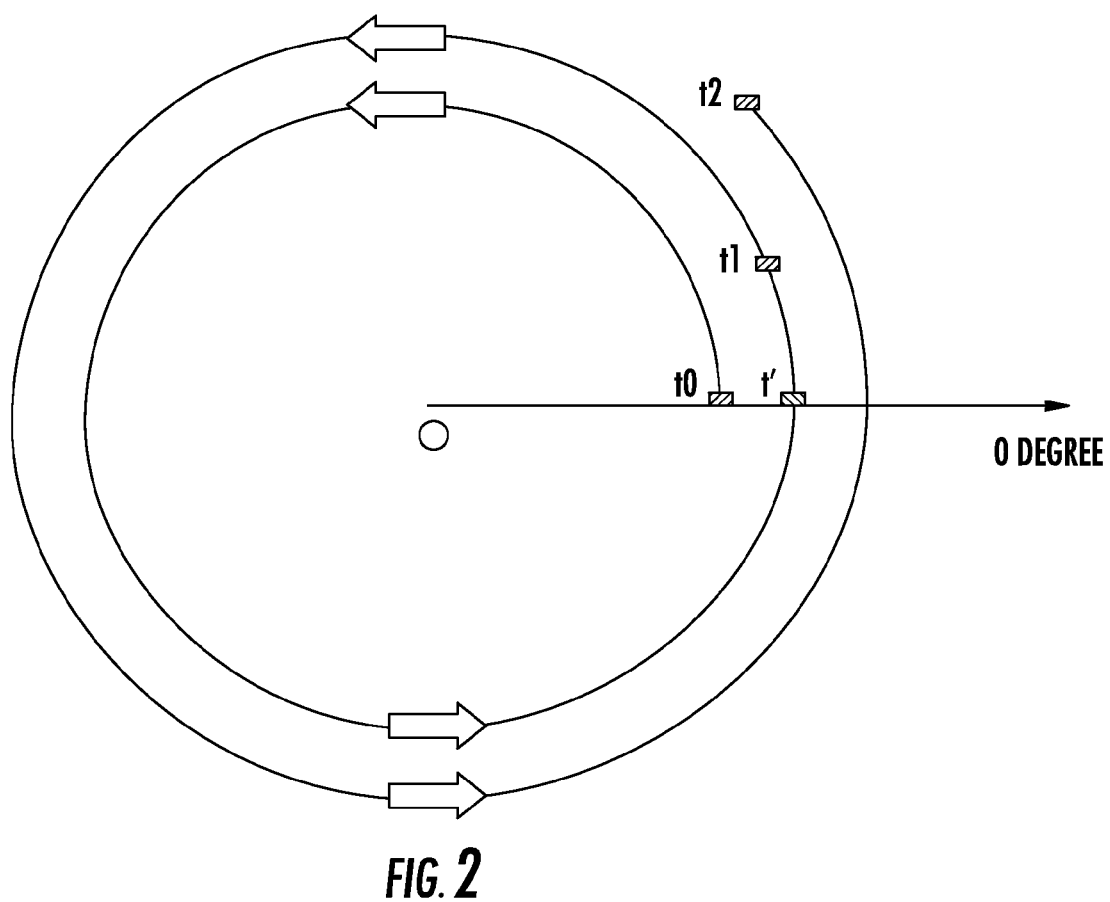
FIG. 2 is a diagram used to demonstrate Light Detection and Ranging (LIDAR) scanning and data acquisition.

In some embodiments, a phase correlation technique may be used to automatically determine a direction of each laser pulse. In some embodiments, a LIDAR unit is fixed in a specific position and horizontally scans the surroundings continuously. For example, FIG. 2 illustrates LIDAR scanning and data acquisition in accordance with an embodiment. In the embodiment of FIG. 2, it may be assumed that: t0 is the beginning of a 1st data set collection and the direction of laser beam is initially 0 degrees; t1 is the beginning of a 2nd data set collection, but the angular position of the laser beam at t1 is unknown; while t' (also unknown) corresponds to when the laser beam is at a position of 360 degrees during the 1st data set collection. It may be further assumed that a data set is approximately equal to an amount of data collected by one full rotation of scanning (e.g., 360 degrees). The duration associated with one data set may be longer or shorter than an actual full rotation of the detector unit due to one or more variables, e.g., motor speed.

If it is assumed that the motor speed is constant during the collection of a single data set, the position P at t1 may be expressed as:

$$P(t1) = a = \frac{360 \cdot \Delta t}{t' - t0} \text{ where } \Delta t = t1 - t'$$

and where 'a' indicates the directional position of the laser beam at t1, which is also the initial position of the 2nd data set collection. Then, the positioning of the laser beam during these two data set collections can be expressed by:

$$P(t) = a\left(1 + \frac{t - t1}{\Delta t}\right)$$

where P(t) is the position or direction of the laser beam at time 't'.

In the above, t0 and t1 may be known due to the control that may be exerted in terms of the beginning of each data collection. If Δt is known or can be obtained, t' may also be obtained. Therefore, P(t) may be obtained by estimating the value of Δt. Phase correlation may be applied to achieve this purpose.

Figure 3A:
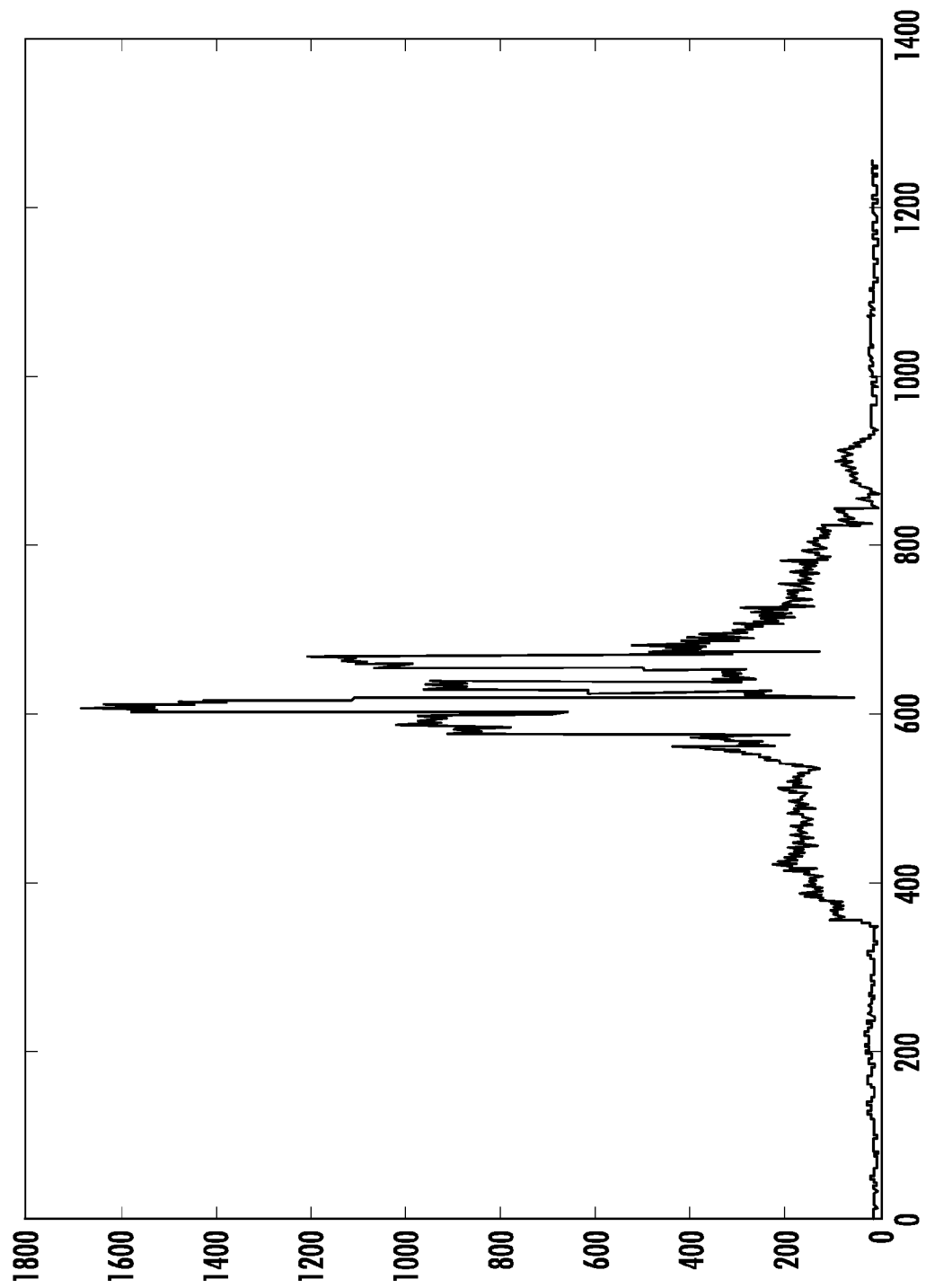
FIGS. 3A-3B are charts illustrating exemplary data sets.
Figure 3B:
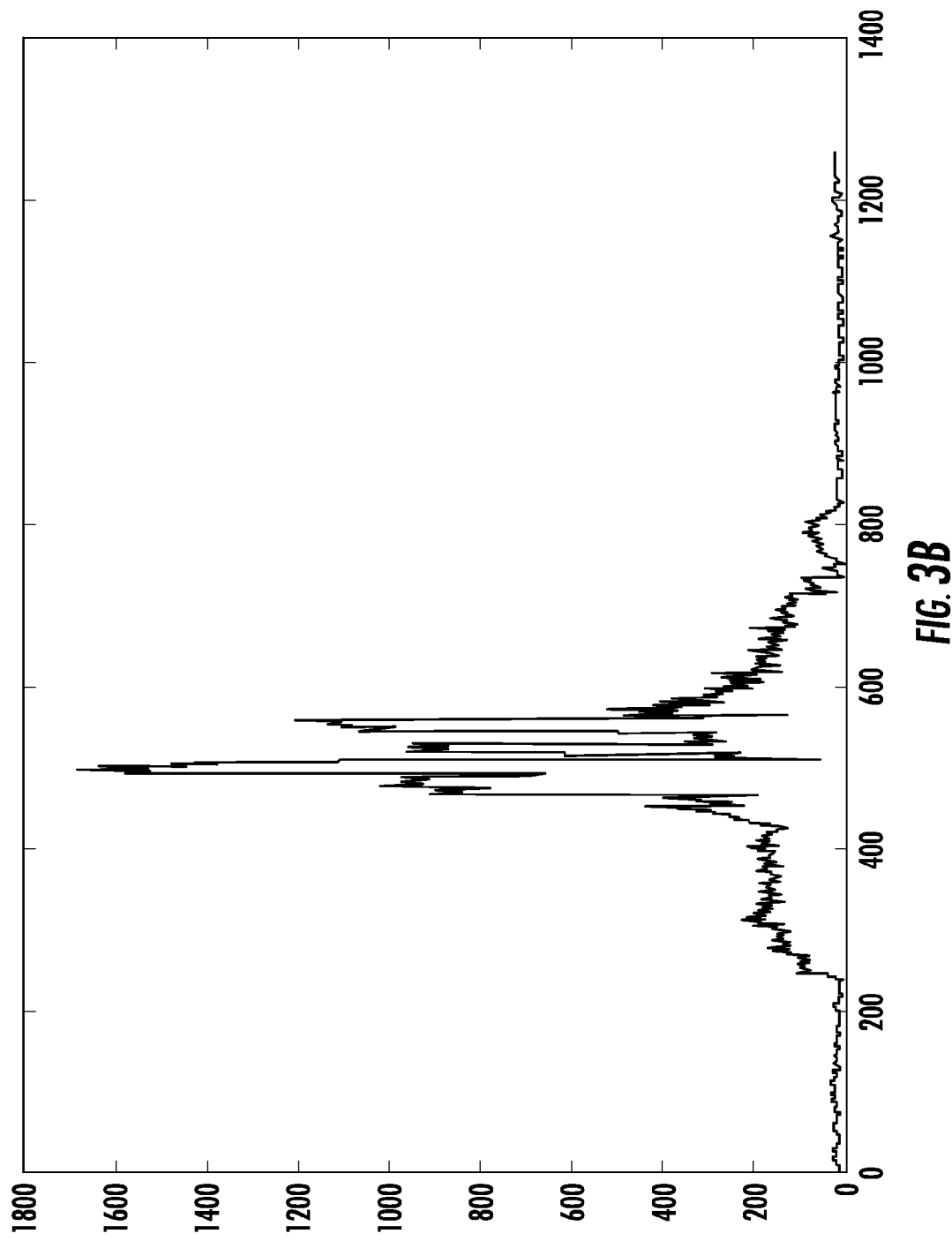

Referring now to FIGS. 3A-3B, LIDAR data for two adjacent data set collections is shown. In each of FIGS. 3A-3B, the horizontal or x-coordinate/axis is the index of each laser beam (indicating the time of each laser beam) and the vertical or y-coordinate/axis is the received LIDAR signal at the corresponding laser beam direction.

Denoting the signal shown in FIG. 3A as f1(t) and the signal shown in FIG. 3B as f2(t), then:

$$f_1(t) = f_2(t - \Delta t)$$

With the principle of phase correlation, the following formula may be used to express the cross-power spectrum:

$$\frac{F_1^*(w) \cdot F_2(w)}{|F_1^*(w) \cdot F_2(w)|} = e^{-i \cdot \Delta t \cdot w}$$

where F1(w) and F2(w) are Fourier Transforms of f1(t) and f2(t), respectively. Then, a phase correlation result may be obtained by applying an Inverse Fourier Transform:

$$F^{-1}(e^{-i \cdot \Delta t \cdot w}) = \delta(t - \Delta t)$$

Figure 4:
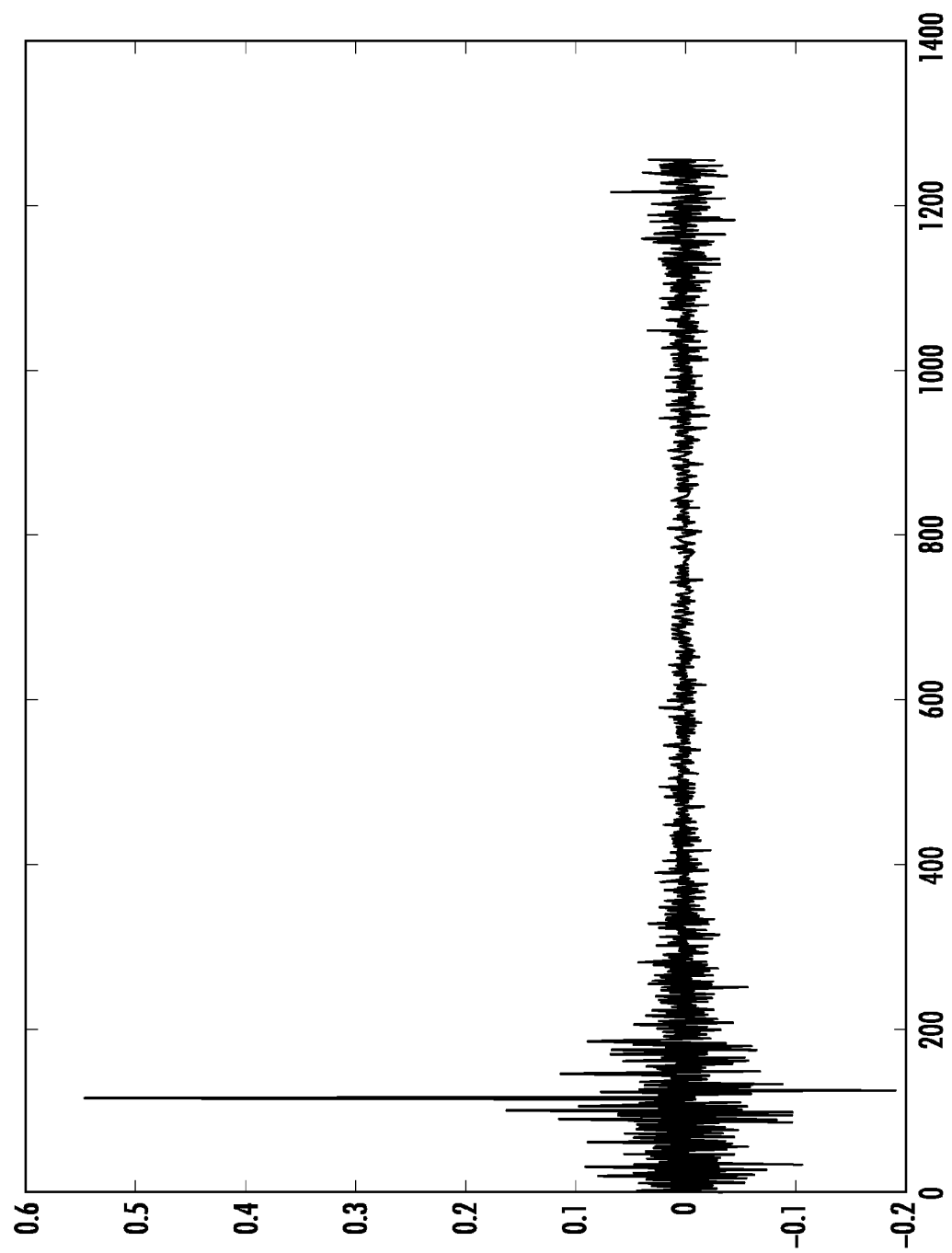
FIG. 4 is a chart illustrating a data set associated with application of phase correlation to the data sets of FIGS. 3A-3B.

FIG. 4 shows the result of applying the phase correlation above. Δt can be estimated by locating a peak in the phase correlation. In operation, as the laser beam rotates continuously, Δt may be re-calculated after each data set is collected. In some embodiments, an optimized Fast Fourier Transform (FFT) is used for fast and efficient calculations. In some embodiments, a position of a rotational laser beam may be determined based on an application of phase correlation, an interrupt, or an encoder. In FIG. 4, the horizontal or x-coordinate/axis corresponds to the index of each laser beam (indicating the time of each laser beam) and the vertical or y-coordinate/axis represents the phase correlation. The peak phase correlation identifies a time shift between the two data set collections. The time shift information may be used to establish an equation between time and angle (direction) of the laser beam in these two data sets.

Figure 5:
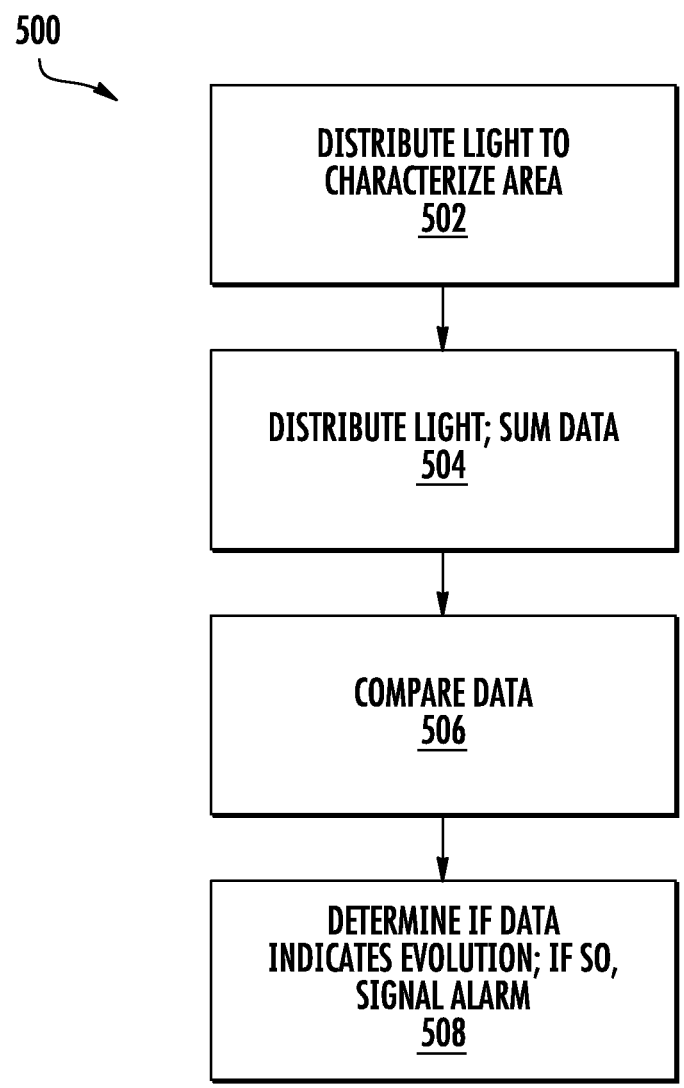
FIG. 5 is a flow chart of an exemplary method.

Turning now to FIG. 5, a flow chart of a method 500 is shown. The method 500 may be operative in connection with one or more environments, systems, devices, or components, such as those described herein. The method 500 may be used to determine the existence or possible existence of smoke or fire in an area that is actively being monitored, such as a room of a warehouse or other large room that is on the order of approximately 10-100 square meters in size.

In block 502, light may be distributed across a space being monitored. As part of block 502, a laser may be pulsed at a particular rate or frequency (e.g., 1 MHz). As part of block 502, a return or reflected signal may be analyzed. In some embodiments, block 502 may be repeated a number of times and may be used to characterize the area being monitored. For example, the location or existence of objects or walls within the area may be determined or identified as part of block 502.

In block 504, the light may be distributed and the signal that is returned or reflected may be summed for, e.g., each position or angle of emission. Time of flight records may be generated as part of block 504. Distance to a particular point in space can be determined based on speed of light characteristics.

In block 506, data associated with one or both of blocks 502 and 504 may be compared to one another, potentially as a function of time. Such comparisons may include comparing ratios of the data to one another. If the comparison(s) of block 506 indicate(s) a change in an amount greater than a threshold, a determination may be made that smoke may be present. Discrimination and rejection of potential false alarm scenarios (e.g. object in beam path) is accomplished by algorithms relying on such ratios and plume growth characteristics.

In block 508, the data may be examined to see if, over time, the data aligns with a characteristic profile of how smoke or a smoke plume tends to expand or evolve. If the data aligns with a smoke or smoke plume profile within a threshold amount, an alarm condition may be signaled or provided. A location of smoke in terms of a distance and an angle relative to a reference direction may be provided as part of block 508.

In some embodiments, one or more of the blocks or operations (or a portion thereof) of the method 500 may be optional. In some embodiments, the blocks may execute in an order or sequence different from what is shown in FIG. 5. In some embodiments, one or more additional blocks or operations not shown may be included.

In some embodiments, the distribution of light as part of blocks 502 and/or 504 may be based on multiple wavelengths or multiple-color scattering. Multiple wavelengths may be used in an effort to reduce nuisance faults (e.g., signaling an alarm condition when no smoke is present). In such embodiments, execution of block 506 may include performing a comparison of (ratios of) data attributable to the different wavelengths, which may be useful for distinguishing smoke from, e.g., a dust cloud or water vapor.

Figure 6:
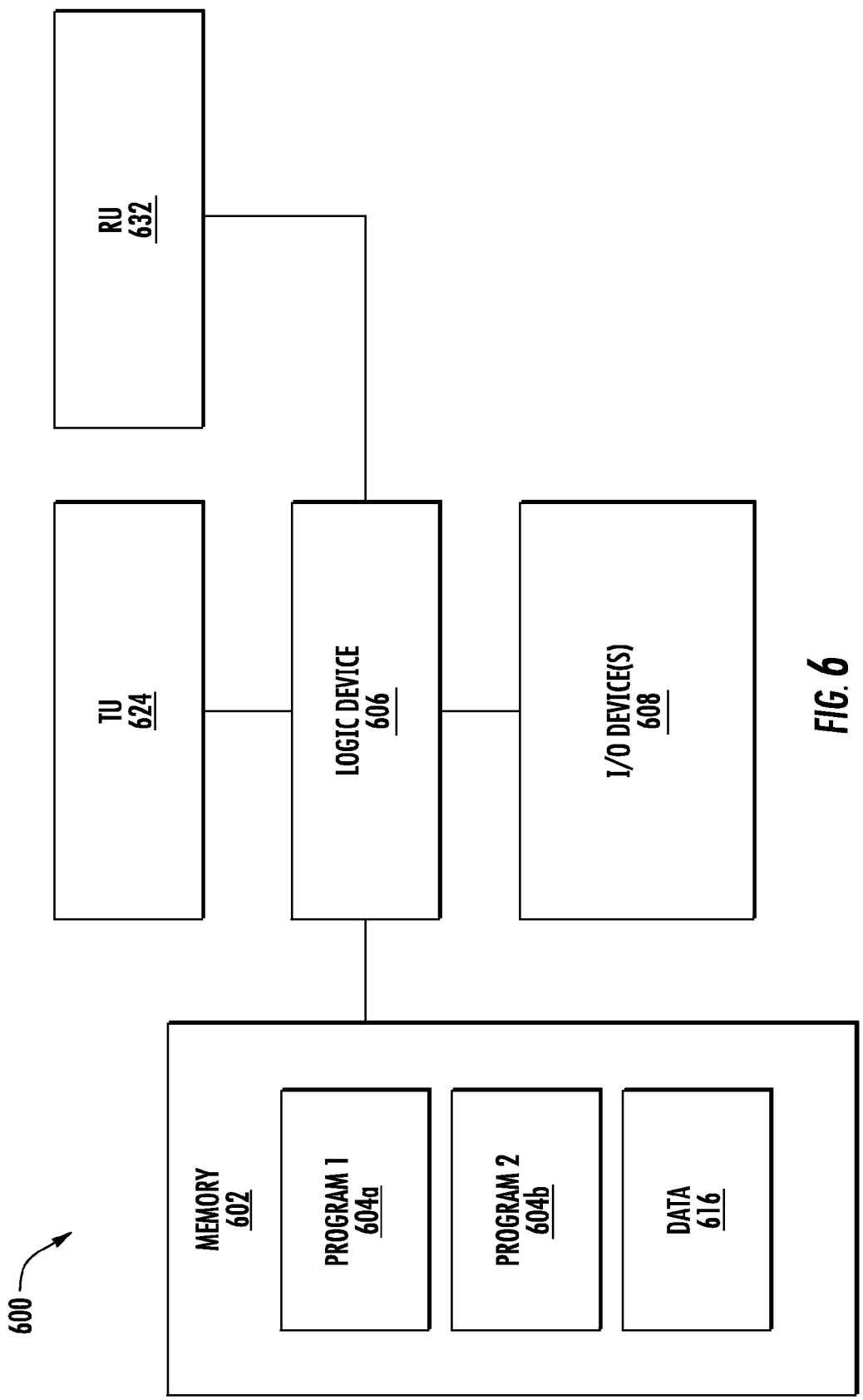
FIG. 6 depicts an exemplary system for detecting smoke.

Turning now to FIG. 6, a system 600 in accordance with one or more embodiments is shown. The system 600 may be associated with a detector, such as a LIDAR detector.

The system 600 is shown as including a memory 602. The memory 602 may store executable instructions. The executable instructions may be stored or organized in any manner and at any level of abstraction, such as in connection with one or more applications, processes, routines, methods, etc. As an example, at least a portion of the instructions are shown in FIG. 6 as being associated with a first program 604a and a second program 604b.

The instructions stored in the memory 602 may be executed by one or more logic devices 606, e.g., a processor, a programmable logic device (PLD) a field programmable gate array (FPGA), etc.

In terms of the use of the logic devices 606, in some embodiments the logic devices 606 may be organized or arranged as a pipeline. For example, in some instances it may be desirable to have an overall time resolution of 1 nanosecond, corresponding to a sampling frequency of 1 GHz. In order to use a low-cost FPGA with a time resolution of 8 nanoseconds, eight such samplers may be arranged in a pipeline, where each may perform a portion (e.g., one-eighth) of the overall work. The metrics provided are illustrative, and any time resolution or number of devices, samplers, or FPGAs may be used in a given embodiment.

The logic device 606 may be coupled to one or more input/output (I/O) devices 608. In some embodiments, the I/O device(s) 608 may include one or more of a keyboard or keypad, a touchscreen or touch panel, a display device, a microphone, a speaker, a mouse, a button, a remote control, a joystick, a printer, a communications transmitter/receiver, a fire panel, etc. The I/O device(s) 608 may be configured to provide an interface to allow a user to interact with the system 600.

The memory 602 may store data 616. The data 616 may be based on a transmission of a laser beam by a transmission unit (TU) 624. The data 616 may be based on a reception of reflected signals by a reception unit (RU) 632, where the reflected signals may be associated with the transmission of the laser beam. The TU 624 and/or the RU 632 may include one or more components, such as a motor, a mirror, and a light source.

The system 600 is illustrative. In some embodiments, one or more of the entities may be optional. In some embodiments, additional entities not shown may be included. For example, in some embodiments the system 600 may be associated with one or more networks. In some embodiments, the entities may be arranged or organized in a manner different from what is shown in FIG. 6.

As described herein, a signal processing approach may be used to determine the position or direction of a scanning laser beam for application of LIDAR based smoked detection. The signal processing approach may be based on phase correlation. The computation time of the approach is low, which may be suitable for low-cost embedded platforms. Accordingly, a LIDAR unit in accordance with this disclosure can be simplified, require less maintenance, have lower cost and be more stable relative to conventional detection units. Embodiments may utilize a low-power LIDAR approach, wherein the power consumption may be less than, or approximately equal to, a conventional laser. Control logic may be simplified relative to conventional systems.

Embodiments of the disclosure may utilize a single detection device within an area to be monitored. Accordingly, a simplified approach to smoke detection is provided for. In some embodiments, a device or unit may be self-commissioning. Once powered on, the unit may scan and learn the background in a given space in less than one minute. After self-commissioning is complete, the unit may automatically begin active-monitoring without human intervention.

Embodiments of the disclosure may actively monitor an area. For example, rather than waiting for smoke to reach the proximity of a detector unit as in conventional systems, aspects of the disclosure may provide for a detector unit that looks for the presence of smoke in an area being monitored. Thus, the time needed to detect smoke can be reduced. For example, smoke may be detected and an alarm condition signaled in less than thirty percent of the time needed in conventional smoke detection systems.

While some of the examples described herein related to the use of LIDAR to actively monitor an area for, e.g., smoke, embodiments of the disclosure may use other technologies or techniques to determine if smoke is located in an area. For example, video techniques may be used in some embodiments.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method for monitoring an area, comprising:
   distributing, by a detector unit, light during a first instance of time in order to characterize the area based on first data associated with the first instance of time, wherein a characterization of the area is based on a determination of a position of a rotational laser beam;
   distributing, by the detector unit, light during at least a second instance of time in order to obtain second data;
   comparing a first portion of the second data to at least one of: a second portion of the second data and the first data; and
   based on the comparison, signaling an alarm condition by the detector unit when an evolution in the second data is detected in an amount greater than a threshold;
   wherein the position of the rotational laser beam is determined by application of phase correlation with two sequential data sets obtained by the detector unit.

2. The method of claim 1, wherein a characterization of the area comprises identifying a location of objects and walls within the area.

3. The method of claim 1, wherein the distribution of light during at least one of the first instance of time and the at least a second instance of time adheres to Light Detection and Ranging (LIDAR) scanning and data acquisition.

4. The method of claim 1, wherein the distribution of light during at least one of the first instance of time and the at least a second instance of time comprises distributing light using a plurality of wavelengths.

5. The method of claim 1, further comprising: providing, by the detector unit, an indication of a location of smoke based on the evolution in the second data.

6. The method of claim 5, wherein the indication of the location of smoke specifies a distance from the detector unit and an angle relative to a reference direction, the method further comprising: overlaying the location of the smoke onto a facility map or fire zone arrangement associated with the area being monitored.

7. An apparatus comprising:
a detector unit;
a rotational laser beam driven by a motor;
memory having instructions stored thereon that, when executed, cause the apparatus to:
distribute light during a first instance of time in order to characterize an area being monitored based on first data associated with the first instance of time, wherein a characterization of the area is based on a determination of a position of a rotational laser beam;
distribute light during at least a second instance of time in order to obtain second data;
compare at least a first portion of the second data to at least the first data; and
based on the comparison, signal an alarm condition when an evolution in the second data is detected in an amount greater than a threshold;
wherein the instructions, when executed, cause the apparatus to determine a position of the rotational laser beam by applying phase correlation with two sequential data sets obtained by the detector unit.

8. The apparatus of claim 7, wherein a characterization of the area comprises an identification of a location of objects and walls within the area and is self-commissioning.

9. The apparatus of claim 7, wherein the instructions, when executed, cause the apparatus to: distribute light during at least one of the first instance of time and the at least a second instance of time using a plurality of wavelengths.

10. The apparatus of claim 7, wherein the instructions, when executed, cause the apparatus to: provide an indication of a location of smoke based on the evolution in the second data.

11. The apparatus of claim 7, wherein the instructions are executed by at least one logic device.

12. The apparatus of claim 7, wherein the apparatus does not include an encoder.

* * * * *